(12) United States Patent
Shavro et al.

(10) Patent No.: US 10,282,282 B2
(45) Date of Patent: May 7, 2019

(54) AUTOMATED HTTP USER FLOWS SIMULATOR

(71) Applicant: Synopsys, Inc., Mountain View, CA (US)

(72) Inventors: Tamir Shavro, Herzlia (IL); Eran Tamir, Rishon-LeZion (IL); Lilian Blochet, Courbevoie (FR)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 15/636,721

(22) Filed: Jun. 29, 2017

(65) Prior Publication Data

US 2018/0004640 A1    Jan. 4, 2018

Related U.S. Application Data

(60) Provisional application No. 62/356,063, filed on Jun. 29, 2016.

(51) Int. Cl.
*G06F 9/44* (2018.01)
*G06F 11/36* (2006.01)
*G06F 17/30* (2006.01)

(52) U.S. Cl.
CPC ...... *G06F 11/3672* (2013.01); *G06F 11/3692* (2013.01); *G06F 17/3089* (2013.01); *G06F 17/30896* (2013.01); *G06F 17/30861* (2013.01)

(58) Field of Classification Search
CPC .......... G06F 11/3664; G06F 2201/865; G06F 11/3612; G06F 11/3668; G06F 9/455
See application file for complete search history.

(56) References Cited

U.S. PATENT DOCUMENTS

| | | |
|---|---|---|
| 6,697,964 B1 | 2/2004 | Dodrill et al. |
| 7,114,112 B2 | 9/2006 | Griffin et al. |
| 7,793,157 B2 | 9/2010 | Bailey et al. |
| 9,043,924 B2 | 5/2015 | Maor et al. |
| 9,275,163 B2 | 3/2016 | Luna et al. |
| 2015/0271188 A1 | 9/2015 | Call |

(Continued)

FOREIGN PATENT DOCUMENTS

WO    WO 2018/002869    1/2018

OTHER PUBLICATIONS

International Search Report and the Written Opinion dated Oct. 18, 2017 From the International Searching Authority Re. Application No. PCT/IB2017/053910. (13 Pages).

*Primary Examiner* — Hanh Thi-Minh Bui
(74) *Attorney, Agent, or Firm* — Sterne, Kessler, Goldstein & Fox, P.L.L.C.

(57) ABSTRACT

A testing method and system for automatic Hypertext Transfer Protocol (HTTP) testing, the system including a memory configured to store sequences of user requests, a program store storing code for emulating a sequence of user requests, and at least one processor coupled to the program store and to the memory for executing the stored code, the code including instructions for generating an emulated request based on a request from a user sequence of requests, transmitting the emulated request to an application, receiving a response to the emulated request from the application, calculating an adapted emulated sequence based on validity of the received response, and instructing transmission of the adapted emulated sequence.

21 Claims, 5 Drawing Sheets

(56) References Cited

U.S. PATENT DOCUMENTS

| | | |
|---|---|---|
| 2016/0156649 A1 | 6/2016 | Hayrynen et al. |
| 2016/0196156 A1* | 7/2016 | Kuwamura ......... G06F 11/3419 717/148 |
| 2017/0351517 A1* | 12/2017 | Diestelhorst .......... G06F 9/3004 |

* cited by examiner

AUTOMATED HTTP USER FLOWS SIMULATOR

RELATED APPLICATIONS

This application claims the benefit of priority under 35 USC § 119(e) of U.S. Provisional Patent Application No. 62/356,063, filed on Jun. 29, 2016. The contents of the above application are all incorporated by reference as if fully set forth herein in their entirety.

FIELD AND BACKGROUND OF THE INVENTION

The present invention, in some embodiments thereof, relates to test automation and, more specifically, but not exclusively, to test automation of hypertext transfer protocol (HTTP) sessions.

In software testing, test automation is the use of special software, usually separate from the software being tested, to control the execution of tests and the comparison of actual outcomes with predicted outcomes.

Many software applications today are written as web-based applications to be run in an Internet browser or a browser engine. There are many advantages to test automation in this field. Most are related to the repeatability and speed of the execution of the tests. There are a number of commercial and open source tools available for assisting with the development of test automation. Test automation has specific advantages for improving the long-term efficiency of a software team's testing processes.

SUMMARY OF THE INVENTION

According to an aspect of some embodiments of the present invention there is provided a testing system for automatic Hypertext Transfer Protocol (HTTP) testing, the system including a memory configured to store sequences of user requests, a program store storing code for emulating a sequence of user requests, and at least one processor coupled to the program store and to the memory for executing the stored code, the code including instructions for generating an emulated request based on a request from a user sequence of requests, transmitting the emulated request to an application, receiving a response to the emulated request from the application, calculating an adapted emulated request sequence based on validity of the received response, and instructing transmission of the adapted emulated request sequence.

In some embodiments of the present invention, the code further includes instructions for comparing the received response to a corresponding pre-recorded response and calculating similarity measure between the received response and the corresponding pre-recorded response, and deciding based on the validity measure whether the received response is valid.

In some embodiments of the present invention, the code further includes instructions for adapting the emulated request based on the validity of the received response and sending the adapted emulated request to the application server.

In some embodiments of the present invention, the code further includes instructions for detecting dependencies between requests in a user sequence and adapting an emulated request dependent on at least one previous request of the sequence by inserting into the dependent request information from a response to the at least one previous request that the emulated request depends on.

In some embodiments of the present invention, the code further includes instructions for identifying in the pre-recorded user sequence at least one previous request to the emulated request that produce at least one dynamic data item required for the emulated request, executing the previous request and extract the at least one dynamic data item from the response to the at least one previous request that produces the required at least one dynamic data item, and inserting the at least one dynamic data item to the emulated request.

The code may further include instructions for inserting the at least one dynamic data item to the emulated request instead of information copied from a corresponding pre-recorded request.

In some embodiments of the present invention, the testing system further includes a token instances repository, and wherein the code further includes instructions for monitoring responses received from an application server to emulated requests, detecting a token value in a monitored response, storing the token value in the token instances repository, and adapting an emulated request by inserting the token value into the emulated request instead of a recorded token value.

In some embodiments of the present invention, the code further includes instructions for executing a client side code in order to generate a token value and adapting an emulated request by inserting the generated token value into the emulated request instead of a recorded token value.

In some embodiments of the present invention, the code further includes instructions for producing testing agents and planting the testing agents in the application server. The testing agents may be configured to monitor activity items in the tested application, associate activity items with an accessed application page and store the activity items in correlation with the associated application page and corresponding user requests, and identify, based on the association, dependent application pages.

In some embodiments of the present invention, the code further includes instructions for determining a target outcome, identifying dependent user requests in the emulated sequence, and producing a reduced emulated sequence by excluding at least one independent request from the emulated sequence executing the emulated sequence without the at least one excluded request and determining the validity of the response, by comparing the response to the target outcome, and removing the at least one independent request from the emulated sequence in case the response is valid.

According to an aspect of some embodiments of the present invention there is provided a method for automatic HTTP testing, the method including generating, by a processor configured to emulate sequences of user requests, an emulated request based on a request from a user sequence stored in a memory, transmitting, by the processor, the emulated request to an application server, receiving, by the processor, a response to the emulated request from the application server, calculating, by the processor, an adapted emulated sequence based on validity of the received response, and instructing transmission of the adapted emulated sequence.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Some embodiments of the present invention provide a testing solution for software development, for example, security testing solution, quality assurance solution, or any process wherein behavior of the monitored application is analyzed in response to emulated requests. In particular, the solution provided by some embodiments of the present invention provides an automated testing tool that efficiently and reliably reproduces pre-recorded HTTP user sequences for testing website(s).

A user sequence, as used herein throughout the present description, is a series of webpage or other application requests, such as HTTP requests executed to emulate actions performed by a browser when a user performs action(s) in a web document such as a webpage or a website or any other HTTP application. As used herein, a browser is a software application for retrieving, presenting, and traversing information resources on the World Wide Web, such as, for example, Mozilla Firefox, Internet Explorer, Chrome, or any other web browser.

In some cases, the user sequence may be relatively long due to a complex sign-in and/or transaction process in the application level, triggered by the user's action, which may be, in some cases, a simple action in the user level for accessing data or browsing a website.

According to some embodiments of the present invention, such user sequences may be emulated by a dedicated testing engine, to produce a valid emulated user sequences. A valid user sequence, as used herein throughout the present description, is a user sequence that results in a valid outcome when executed.

Some embodiments of the present invention provide solutions for automatic simulation of user sequences such that a valid and/or desirable result will be achieved. Usually, automatic simulation of user sequences may face some complexities, as indicated herein. For example, some solutions replay pre-recorded HTTP sequences. However, user sequences may often include one-time tokens and dependencies between pages, and therefore reusing of the same recorded values and requests may yield invalid responses of the tested application. In some embodiments of the present invention, dependent requests may be identified and adapted such that a valid response may be achieved. For example, dependent requests may be adapted by executing dependent requests in a required order and inserting, into a dependent request, information from a previous response.

Additionally, execution of complete user sequences may sometimes be inefficient and may include redundant steps, which may not be required for reaching the desired outcomes. Some embodiments of the present invention may provide reduced or minimal user sequences, i.e. user sequences that include reduced and/or minimal number of requests, compared to the original sequence, and that enable a pre-determined outcome. Such reduced/minimal sequences may reduce the processing time and/or power required for a certain test.

As described in more details herein below, minimal/reduced user sequences may be produced, according to some embodiments of the present invention, by first identifying, in the emulated sequence, independent requests, for example requests that don't require data from other requests and don't produce data required by other requests. Then, the testing system attempts to exclude the independent user requests from the sequence. After each removal, the system checks the validity/desirability of the outcome, and finally removes the request in case it is not required for a valid and/or desired outcome.

Additionally, solutions according to some embodiments of the present invention may provide a method for deciding whether an application response is valid or invalid, and a method for adapting and re-submitting an emulated HTTP request until a valid and/or desired response is received from the application server.

Accordingly, the methods and systems described herein allow automatic generation and execution of efficient and valid user browsing sequences. The efficient and valid browsing sequences are reproduced according to a machine learning of responses wherein responses are classified as valid or invalid. The machine learning may include an adaptation mechanism that adjusts HTTP requests during a training phase, until valid and/or desired responses are achieved.

It will be appreciated that the monitored application according to embodiments of the present invention may be a website, a web service, a web or mobile application, any suitable source of hypertext content or service, or any other suitable HTTP application. Additionally, it will be appreciated that the application server may include one or more network nodes such as servers and/or virtual machines.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, a testing engine according to embodiments of the present invention may compute an efficient, valid and emulated browsing sequence by an iterative learning process, in which the emulated requests are adapted according to the validity of the responses received from the monitored application server.

Figure 1:
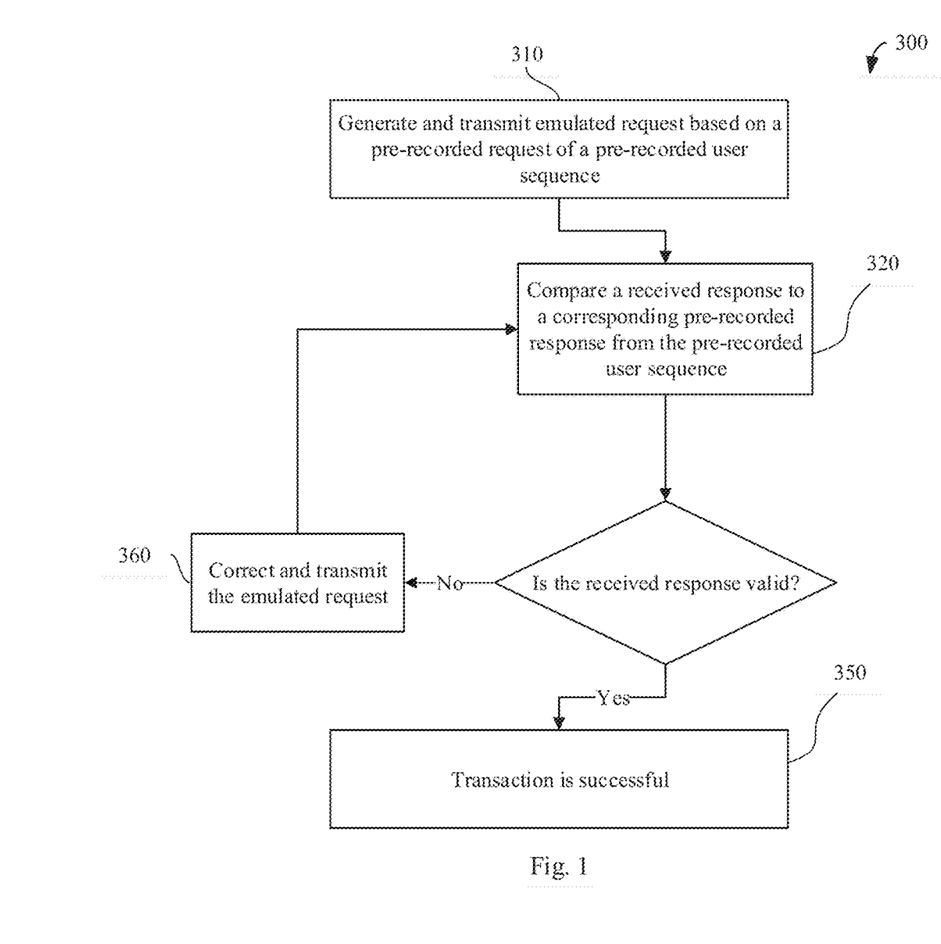
FIG. 1 is a schematic flowchart illustrating a method for iterative correction of an emulated request according to the validity of a received response according to some embodiments of the present invention.

Reference is now made to FIG. 1, which is a schematic flowchart illustrating a method 300 for iterative correction of an emulated request according to the validity of a received response according to some embodiments of the present invention. Method 300 may be executed by a testing system, provided according to some embodiments of the present invention for testing an application's functioning. The testing system may execute a testing engine which may run on a user's device or on a remote server. In some embodiments, some of the engine's operations are executed by a remote server and some on a user's device and/or the application server.

Figure 3:
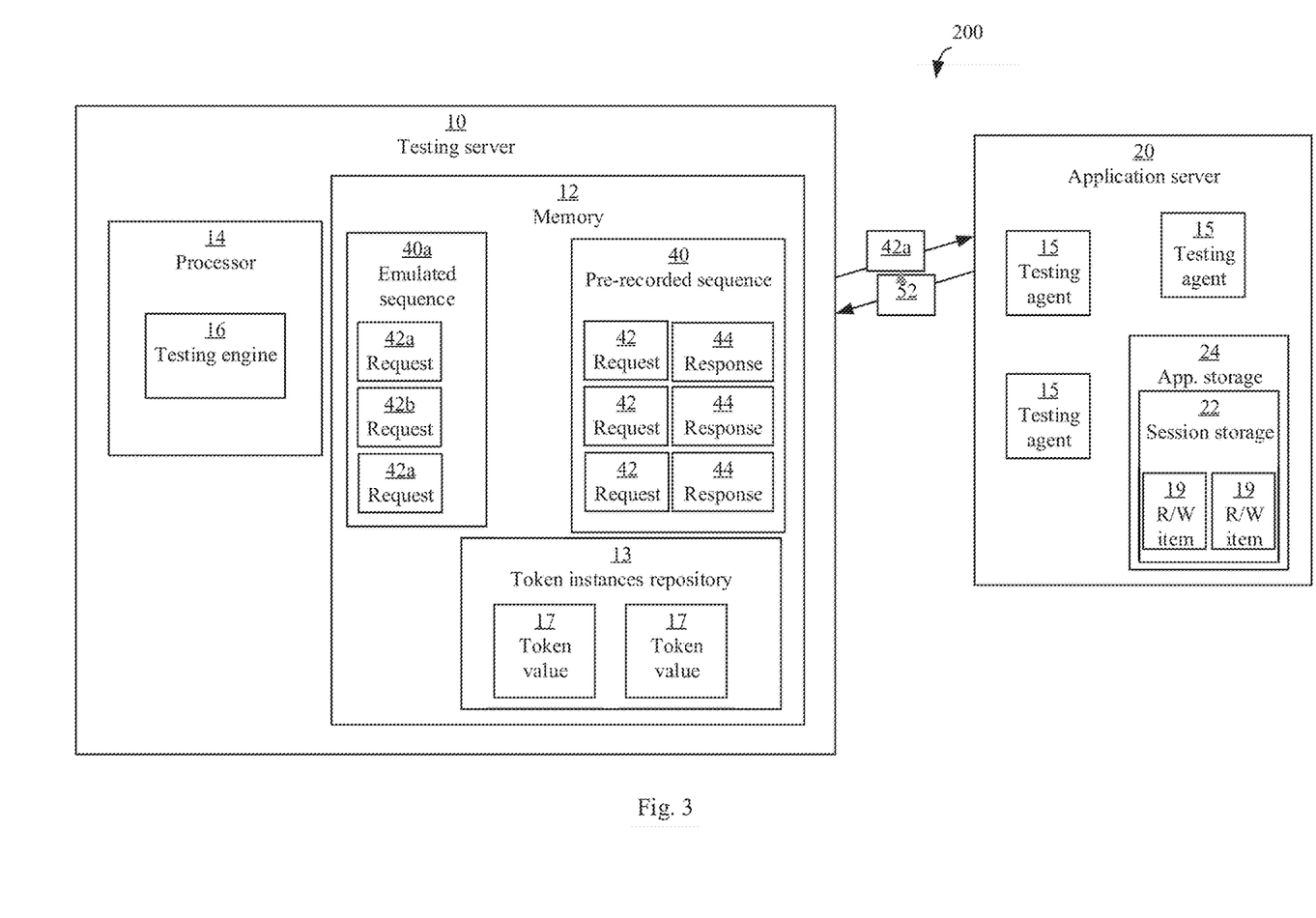
FIG. 3 is a schematic illustration of a system for automatic HTTP testing according to some embodiments of the present invention.

Further reference is now made to FIG. 3, which is a schematic illustration of a system 200 for automatic HTTP testing according to some embodiments of the present invention. System 200 may include a testing server 10 and HTTP application server 20. Testing server 10 may communicate with server 20. Further, testing server 10 may execute a testing engine 16 to monitor a HTTP application run and controlled by server 20.

Testing engine 16 may be a software code or application, also referred to as a module, and testing server 10 may be a client device, a server, a virtual machine, and/or any network node having computational abilities.

Testing server 10 may include a memory 12 and a processor 14, which may execute testing engine 16. Memory 12 may store pre-recorded user sequences, which may include sets of user HTTP requests, for example for accessing a plurality of hypertext content documents. The stored pre-recorded user sequences may also include pre-recorded received responses from the monitored application, received in response to the pre-recorded requests. As indicated herein, the pre-recorded sequences may include sequences recorded manually by a user, and/or sequences recorded automatically by preconfigured scripts running by a browser or any other suitable HTTP application.

In some embodiments of the present invention, the pre-recorded user sequences may include real-time manually inputted sequences and/or script generated sequences.

Testing engine 16 may perform tests by reproducing the pre-recorded HTTP requests, for example by emulating the pre-recorded requests. Engine 16 may send the emulated requests to application server 20, and receive responses to the emulated requests from application server 20. Then, testing engine 16 may examine whether a received response is a valid or invalid response. In case the response is invalid, engine 16 may perform a correction or adaptation of the emulated requests, for example by executing an adaptation mechanism, as described in more detail herein. Then, engine 16 may send the corrected emulated request and receive a response, and so on, until, for example, a valid response is achieved.

Accordingly, as indicated in block 310, testing engine 16 may generate an emulated request based on a pre-recorded request of a pre-recorded user sequence, and transmit the emulated request to an application server. The pre-recorded sequences may include, for example, sequences recorded manually by a user, and/or sequences recorded automatically by preconfigured scripts running by a browser or any other suitable HTTP application.

In some embodiments of the present invention, the pre-recorded user sequences may include manually inputted sequences, for example by a user input device such as, for example, a keyboard, and/or script generated sequences.

As indicated in block 320, testing engine 16 may receive from application server 20 a response to the emulated request, and compare the received response to a corresponding pre-recorded response from the pre-recorded user sequence. For example, processor 14 may execute a text comparison algorithm that compares the text of the pre-recorded response to the text of the received response. Based on the comparison, processor 14 may, for example, calculate a similarity measure, and decide whether the transaction is successful, i.e. the received response is valid, or failed, i.e. the received response is invalid.

In order to decide whether the received response is valid, testing engine 16 may set a threshold of similarity percentage of the received response to the pre-recorded response, above which the received response is marked as valid, or below which the received response is marked as invalid. The threshold may be set so as to allow insignificant variations between the pre-recorded response and the received response, so that the text of the received response may vary from the text of the pre-recorded response. For example, the threshold may be set to 70%, 75%, 80%, or to any other suitable percentage value of text similarity between the received response and the pre-recorded response.

In some cases, the comparison may be performed between portions of received response and the pre-recorded response. For example, for the comparison, some parts of the received response and/or the pre-recorded response may be removed, for example parts identified as redundant and/or dynamic parts such as, for example, dynamic tokens, that change between instances of the response and therefore may distort the comparison. Additionally, the removal of redundant/dynamic parts may make the comparison process more efficient, for example, by saving time and computing resources.

As indicated in block 350, in case the received response is valid, testing engine 16 may identify the transaction as successful. As indicated in block 360, in case the received response is not valid, testing engine 16 may adapt or correct the emulated request, to generate an adapted emulated request, and send the adapted/corrected emulated request to application server 20, and the method repeats from block 320.

As described herein, in some embodiments of the present invention engine 16 detects when a certain request requires a token that was received in a previous response to a previous request, or when a previous request enabled the process continuance. For example, application server 20 may use information included in a request to make sure that previous required steps have been performed. In such cases the emulated requests may be adapted to include information required for a successful transaction, e.g. transaction that results with a valid response.

Figure 2:
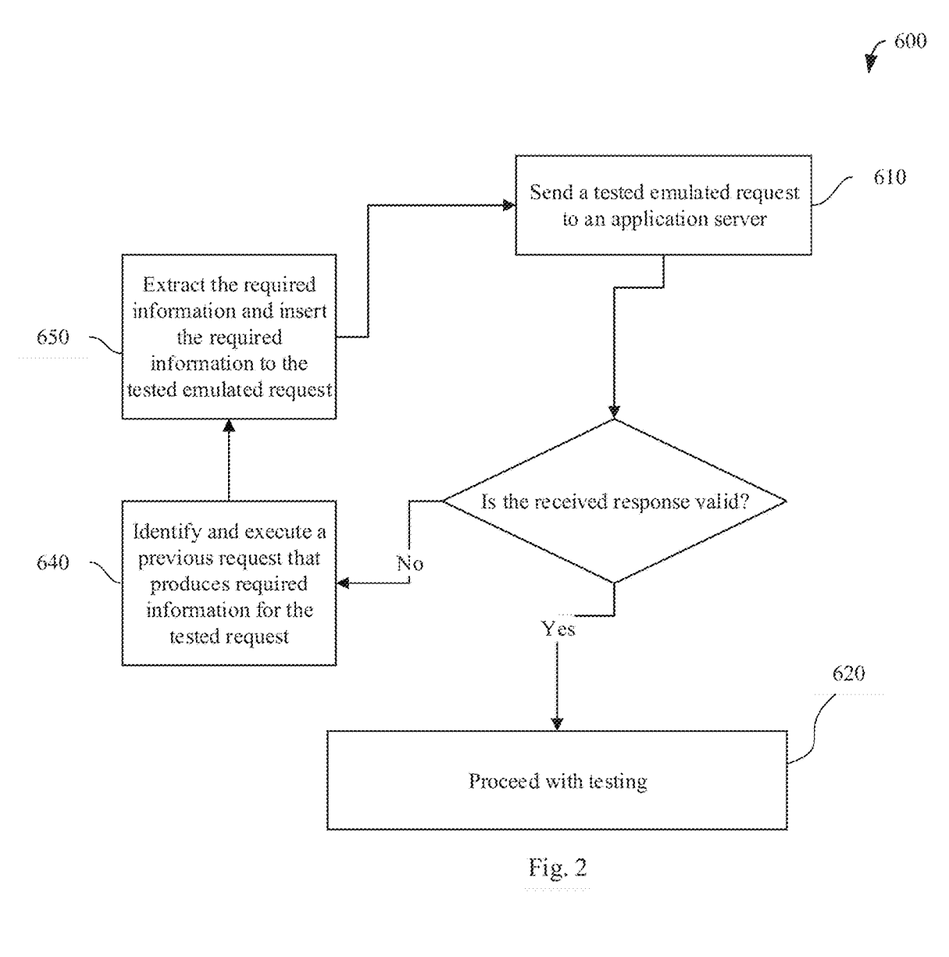
FIG. 2 is a schematic flowchart illustrating a method for identifying dependency between requests of the user sequence according to some embodiments of the present invention.

Accordingly, some embodiments of the present invention provide a method for detecting dependency between requests. Reference is now made to FIG. 2, which is a schematic flowchart illustrating a method 600 for identifying dependency between requests of the user sequence according to some embodiments of the present invention. The user sequence is a sequence of user requests. As indicated in block 610, testing engine 16 may send a tested emulated request to application server 20. In case a valid response is received from application server 20, as indicated in block 620, the processor may proceed, for example, with the testing of the pre-recorded sequence. In case an invalid response is received, processor 14 may execute an adaptation process to produce an adapted version of the tested emulated request.

For example, as indicated in block 640, processor 14 may execute text analysis to identify previous request(s) in the sequence that produce dynamic data item(s) required for proper execution of the tested request. For example, the dynamic data item may include a dynamic token or any piece of information that may change between different instances of a response to similar/identical requests. Such dynamic data items may become invalid after one use or a certain pre-determined number of uses, or after a certain pre-determined amount of time. For example, the tested request may call for a page that requires information from another page, or the tested request may require a dynamic token that was fetched by a previous request.

Therefore, processor 14 may execute the identified previous request for fetching that another page or dynamic token, previously to execution of the tested request. Then, as indicated in block 650, processor 14 may extract the dynamic data item(s) from the response to the previous request and insert the dynamic data item(s) to the tested emulated request.

In some embodiments, the tested emulated request may be modified by insertion of instructions to a piece of code that creates the request to fetch values from other requests and insert the fetched values to the tested request code, instead of values copied from the corresponding pre-recorded request. Thus, for example, when the emulated request is executed, the dynamic data item may be automatically extracted from the previous request and inserted to the tested emulated request.

Then, testing engine 16 may return to sending the tested emulated request to application server 20, as indicated in block 610, and so on, for example, until a valid and/or desired response is received.

Accordingly, engine 16 may monitor HTTP responses to emulated requests, and calculate instructions to submit emulated HTTP requests in a certain determined order.

As described herein, engine 16 may extract tokens from HTTP responses and embed the extracted tokens in other, for example, later, emulated HTTP requests. The tokens may be extracted by combining data from a plurality of responses or based on data from a single response. By embedding previously extracted tokens in following emulated requests, engine 16 may acquire a valid response from application server 20, as described in detail herein.

Some embodiments of the present invention may include a non-transitory computer readable storage medium that may store program instructions, which, when executed by a processor carry out methods 300, 600, and/or other processes described herein.

In more detail, processor 14 may receive pre-recorded user sequences 40 and, for example, store them in memory 12. Each pre-recorded user sequence 40 may include a plurality of HTTP requests 42, for example with instructions to transmit the requests to an application server in a predefined order. Prerecorded user sequence 40 may also include pre-recorded responses 44 that were received in response to pre-recorded requests 42. As described herein, processor 14 may emulate HTTP requests 42 from pre-recorded user sequence 40, to create emulated requests 42a. Then, engine 16 may send emulated requests 42a to application server 20.

Engine 16 may receive from application server 20 responses 52 to emulated HTTP requests 42a, and/or monitor responses 52. As described, engine 16 may then analyze responses 52 to detect token-including HTTP responses among the HTTP responses and/or token carrying HTTPS requests among the HTTP requests. For example, engine 16 may identify in a pre-recorded request 42a text fragment that may constitute a token, and/or may execute text comparison between a pre-recorded request 42 and a previous pre-recorded response 44 to find a matching identified text fragment that may constitute a token. The identified text fragment may be marked as a potential token, for example in case an invalid response will be received from the application server upon sending of the corresponding emulated request 42a.

In some other embodiments, engine 16 may execute text comparison between pre-recorded responses 44 and monitored responses 52, and identify token-including HTTP responses by identifying dissimilarities between pre-recorded responses 44 and monitored responses 52.

As indicated above, in some cases, for example when a one-time token is needed for a successful transaction, reproduction of a pre-recorded sequence that includes a recorded token may fail the transaction. Testing engine 16 may adapt the emulated request, for example in case the response is invalid. Engine 16 may analyze a pre-recorded user scenario and identify one-time tokens within the pre-recorded scenario.

For example, engine 16 may parse an emulated request and/or the corresponding received response and search for a token value 17 such as, for example, an HTTP POST/GET parameter name and/or value, HTTP header name and/or value such as, for example, HTTP Cookies, and/or any other token value in a parse-able HTTP body such as, for example, JSON, SOAP, XML, GWT, etc. Engine 16 may store the found token values 17 in a token instances repository 13, for example, in memory 12. Then, engine 16 may reproduce a corrected emulated request 42a by adding one of the stored token values 17 into an emulated request 42a, for example, instead of a recorded value included in the emulated request 42a.

Then, engine 16 may submit the corrected emulated request 42a to application server 20 and check the validity of the response 52, for example, as described in detail herein above with reference to FIG. 1. In such manner, extracted and embedded values are used in a following iteration, until a valid emulated sequence of requests is achieved.

In some embodiments of the present invention, a client side code may also be executed by engine 16, in order to get the values of parameters assigned on the client side and, for example, embedding such values and parameters in emulated requests. For example, a received response may include a client side code such as, for example, JavaScript or Flash code, that may generated, when executed, a valid token value. Therefore, engine 16 may use the client side code in order to generate a token value and embed the generated token value in an emulated request.

In some embodiments of the present invention, application server 20 may include application storage 24. Application storage 24 may include user session storage 22, e.g. of items stored in application storage 24 and/or retrieved from application storage 24 during a user's session. User session storage 22 may store, inter alia, activity items 19. For example, activity items 19 may include session activity, database and/or file system activity items, for example insert/select and/or read/write activities, such as operations and/or attempts of reading from application storage 24 and writing to application storage 24 during a user's session.

Testing engine 16 may detect in the monitored application executed by server 20 dependencies between pages, such as, for example, pages that need to be activated in a specific order. Such dependencies may be carried out by one-time tokens, e.g. tokens which are disposable after one use. For example, a first page may produce a one-time token needed for activation of a second page. In such cases, reproduction of the pre-recorded sequence may yield unsuccessful transaction.

Engine 16 may identify dependencies between different pages requested by the pre-recorded HTTP requests, for example in order to adapt emulated requests to the detected dependencies, as described in detail herein.

In order to detect dependencies between pages, engine 16 may produce and plant testing agents 15 in application server 20 and/or in various locations in the monitored application. Agents 15 may include, for example, software components that utilize software profiling and/or debugging techniques in order to plant hooks in the application code, such as, for example, instrumentation software tools that may monitor the application's various activities and behavior.

For example, engine 16 may instruct application server 20 to plant such agents 15 in the application code. For example, testing agents 15 may be added to the monitored application code and/or may be set to intercept function calls and/or messages and/or events passing between software components of the monitored application. Testing agents 15 may monitor events and data elements in monitored application 21, and/or may detect activity items 19 in user session storage 22. Engine 16 may associate data monitored by testing agents 15 with an accessed application page, and may store data monitored by testing agents 15 in correlation with the associated application page and the corresponding tested HTTP requests and the received HTTP responses.

In the association process between the data monitored by agents 15 and the accessed application page, agents 15 may communicate with engine 16. Engine 16 may send a request to one or more agents 15 planted in application server 20 to monitor an application 21 running by application server 20. While application server 20 processes a request 42a, agents 15 may collect information from application 21, such as activity items 19, which may be stored in user session storage 22.

When application server 20 sends a response 52 back to testing engine 16, testing engine may request to receive the information collected by agents 15 during the processing of request 42a and/or receive the requested information from agents 15 and, for example, detect dependencies between requests and/or pages, as described in detail herein.

Engine 16 may ascribe, for example, one or more activity items 19 to a corresponding page, during which activity the ascribed one or more items 19 such as read/write operations and/or attempts occur. Based on the ascription, engine 16 may identify different pages that use the same items 19 and/or corresponding data fields and/or memory addresses, and/or may identify how the items, data fields and/or addresses are used, and therefore may identify pages as dependent and/or the type of dependency.

For example, engine 16 may send sequential page requests a, b, c, . . . , x related with respective pages A, B, C, . . . , X. In response to request a, engine 16 may receive a response Ar from server 20. In response to request b, engine 16 may receive a response Br from server 20, and a Write operation item 19 from agent(s) 15 that relates to page B. In response to request x, engine 16 may receive a response Xr from server 20, and a Read operation item 19 from agent(s) 15 that relates to page X. Engine 16 may identify that the received Read operation related to page X corresponds to the received Write operation related to page B.

The correspondence may be identified, for example, based on the locations in which the Write and Read operations were performed in session storage 22, for example locations related to the same session. That is, when application server 20 processes request b for page B, it performs a Write activity item 19 in session storage 22, which is later read during the process of request x for page X, and therefore the Read activity item 19 performed in a related location. Accordingly, engine 16 may identify that page X depends on Page B, and/or that request x depends on request b, and include requests b and x in the same emulated sequence, for example an emulated sequence that requires getting page X.

Engine 16 may use the detected dependencies for ascribing several HTTP requests to a same HTTP user sequence or emulated user sequence, and/or to identify HTTP requests which are essential to conduct a valid browsing scenario. Emulated requests identified by engine 16 as essential for a valid browsing sequence, may have greater priority and/or may go through a testing and/or correction procedure by engine 16 before other requests, in order to produce a valid browsing sequence by using reduced/minimal resources.

As described in detail herein, engine 16 may compute an efficient valid emulated browsing sequence, i.e. an emulated browsing sequence that achieves a valid and/or desired outcome, which also may include a minimal set of emulated HTTP requests or a reduced set of emulated HTTP requests compared with the corresponding pre-recorded browsing sequence.

Based on the methods described in detail herein, engine 16 may produce and/or carry out instructions for executing a valid and/or desirable emulated browsing sequence, for example, an emulated browsing sequence that performs the action performed by a corresponding pre-recorded browsing sequence.

The valid emulated browsing sequence may be deduced by engine 16, for example, by an iterative process based on a pre-recorded browsing sequence. During iteration, engine 16 may check whether an outcome of a tested emulated browsing sequence is valid and/or desirable. A valid and/or desirable outcome of a valid browsing sequence may include, for example, a certain performed action such as, for example, loading of media, downloading of or an access to certain content, a login, submission of data, and/or any other suitable performed action.

Figure 4:
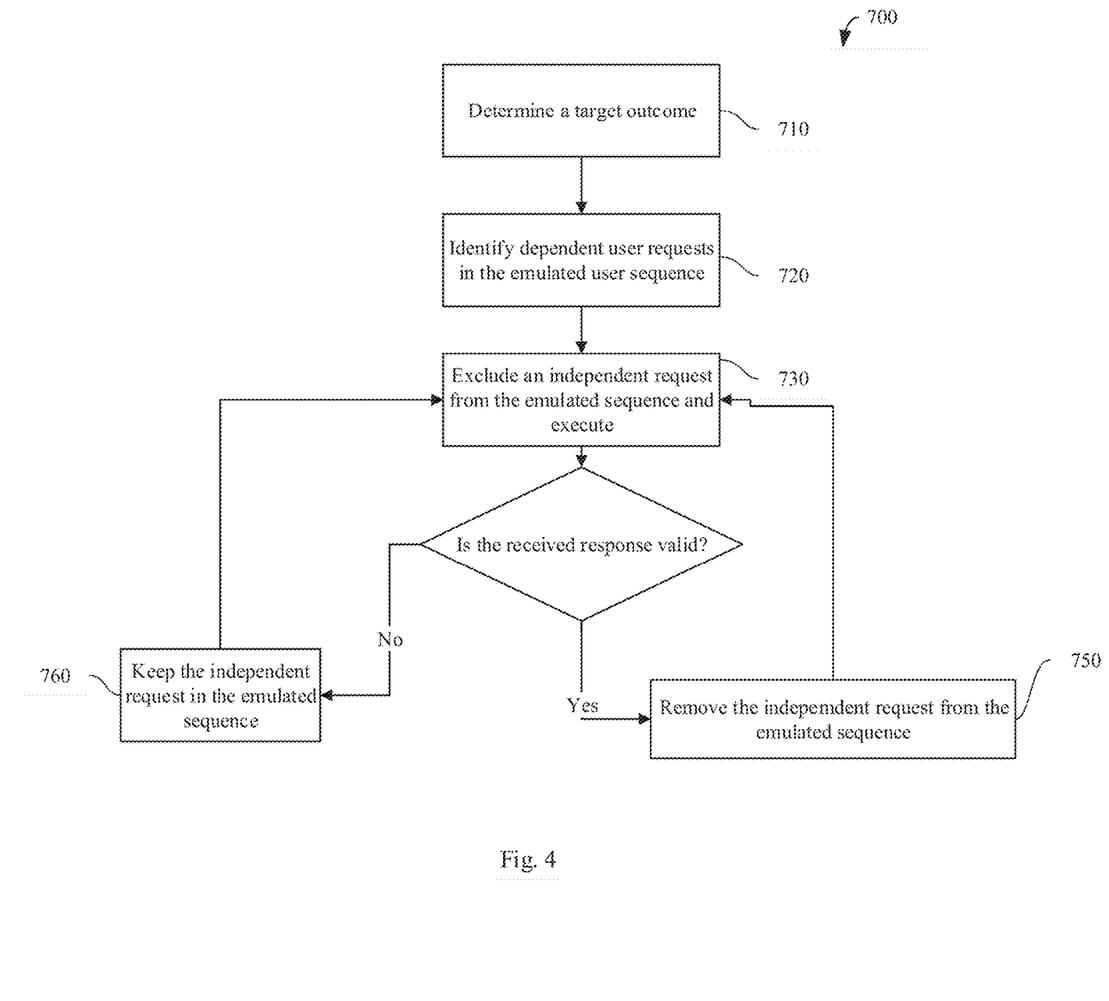
FIG. 4 is a schematic flowchart illustrating a method for generating a reduced emulated user sequence according to some embodiments of the present invention.

In some embodiments of the present invention, engine 16 may produce a minimal set of emulated requests needed for reaching a desired outcome. Reference is now made to FIG. 4, which is a schematic flowchart illustrating a method 700 for generating a reduced emulated user sequence according to some embodiments of the present invention. As indicated in block 710, engine 16 may determine a target outcome such as, for example, a certain application page to reach, certain information to obtain, and/or any other suitable outcome of HTTP user sequence execution. As indicated in block 720, engine 16 may identify dependent user requests in the emulated user sequence.

For example, engine 16 may identify a request that needs to include information acquired from a previous response, and/or requests that relate to a common application page, and/or any other dependency between requests as described in detail herein. Based on the identification of dependent requests, engine 16 may produce a reduced emulated user sequence, for example by iterative attempts as follows. As indicated in block 730, engine 16 may exclude an independent request, e.g. a request without a request dependent thereon and/or dependency on another request, from the emulated sequence.

Engine 16 may execute the emulated sequence without the excluded request and determine the validity of the response, i.e. the outcome of the emulated sequence execution, by comparing the response to the target outcome, for example by executing a text comparison. As indicated in block 750, engine 16 may remove the independent request from the emulated sequence in case the response is valid and thus, for example, generate a reduced emulated sequence that may provide a valid and/or desired outcome.

As indicated in block 760, engine 16 may keep the independent request in the emulated sequence in case the response is invalid. In case there are additional independent requests, engine 16 may execute additional iterations of attempts to reduce the emulated sequence.

Figure 5:
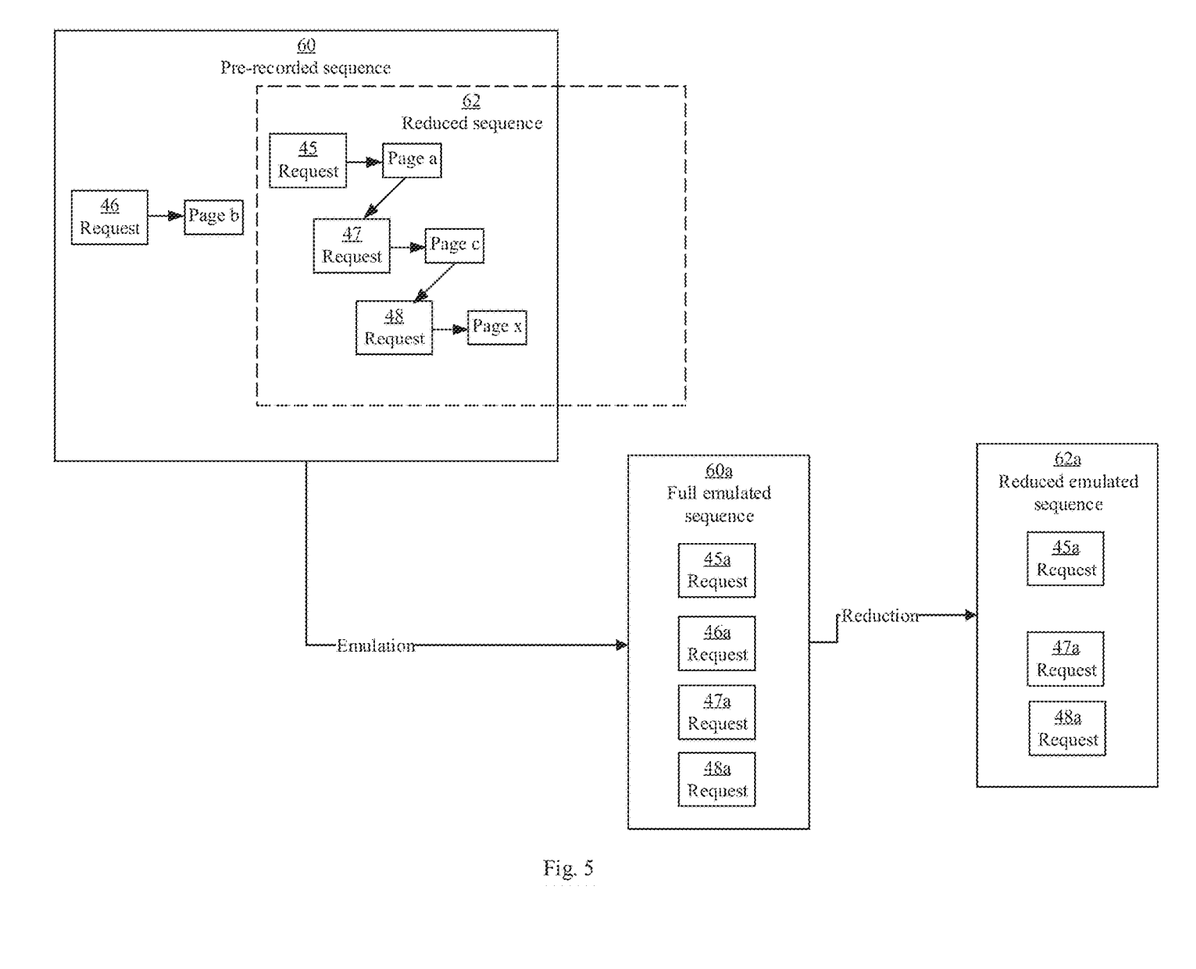
FIG. 5 is an exemplary schematic illustration of reduced user sequence generation according to some embodiments of the present invention.

An exemplary schematic illustration of reduced user sequence generation according to some embodiments of the present invention is shown with reference to FIG. 5. For example, engine 16 may decide that receiving a certain page x is a desired outcome, for example based on a pre-recorded sequence 60. In pre-recorded sequence 60, for example, the user may approach a series of pages, for example pages a, b and c, before approaching page x, for example by series of respective requests 45-48. However, for example, only one or some of the series of pages, for example only pages a and c, are required in order to approach page x, and accordingly only a sub-set of the pre-recorded sequence 60 is needed for approaching page x.

For example, request 47 may require information from page a, and request 48 may require information from page c. Therefore, a reduced sequence 62 may suffice for reaching page x. Engine 16 may generate a minimal/reduced emulated sequence 62a that includes only the requests required for accessing page x. For example, engine 16 may produce a minimal emulated sequence by starting from a complete emulation 60a of the pre-recorded sequence and gradually reducing the emulated sequence by gradually excluding requests.

For example, complete emulated sequence 60a may include emulated requests 45a, 46a, 47a and 48a, which may be reproduced from requests 45, 46, 47 and 48, respectively. Engine 16 may attempt to reduce emulated HTTP sequence 60a by eliminating one or more emulated HTTP requests of the emulated browsing sequence that are not identified as inducing token-including HTTP responses, for example, once or during a plurality of iterations. In case the reduced emulated sequence 62a achieves a valid and/or desirable outcome, the eliminated emulated request may be removed. In case the outcome of this elimination is invalid and/or undesirable, the eliminated emulated request is returned and/or kept in the emulated sequence.

Accordingly, engine 16 may execute the emulated sequence 60a/62a after each of the exclusions, or after a series of exclusions at a time, and may check the validity and/or desirability of the outcome of the reduced sequence. Engine 16 may proceed with the reducing attempts of the emulated sequence 60a/62a until, for example, a valid and/or desired outcome is reached with a reduced and/or minimal emulated sequence 62a, or may keep complete emulated sequence 60a in case no request is redundant. For example, a valid reduced emulated sequence 62a may include emulated requests 45a, 47a and 48a, which may result, once executed, in receiving page x, as required.

The methods as described above are used in the fabrication of integrated circuit chips.

The descriptions of the various embodiments of the present invention have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a unit, a system, a web application, a website, and a webpage is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range.

For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for automatic testing of web service, the system comprising:
    a memory configured to store a sequence of requests;
    a program store storing code; and
    at least one processor coupled to the program store and to the memory for executing the stored code, the stored code comprising instructions that, when executed, cause the processor to perform operations comprising:
        generating an emulated request based on a first stored request of the sequence of requests stored in the memory,
        transmitting the emulated request to an application coupled to the system,
        receiving a received response to the emulated request from the application,
        detecting a dependency between the first stored request and a second stored request of the sequence of requests stored in the memory, based on whether the received response to the emulated request is valid;
        calculating an adapted emulated request sequence based on the dependency, wherein the adapted emulated request sequence is a result of an adaptation process executed by the processor using a machine learning (ML) based adaptation mechanism; and
        transmitting the adapted emulated request sequence to the application; and
        adapting, by the processor, a dependent emulated request that depends on a previous request of the sequence of requests by inserting, into the dependent emulated request, information from a response to the previous request on which the dependent emulated request depends.

2. The system of claim 1, the operations further comprising:
    comparing the received response to a corresponding pre-recorded response;
    determining a similarity measure between the received response and the corresponding pre-recorded response; and
    deciding based on the similarity measure whether the received response is valid.

3. The system of claim 1, wherein the application is in an application server, and wherein the operations further comprise sending the adapted emulated request sequence to the application server.

4. The system of claim 1, wherein the operations further comprise adapting the dependent emulated request corresponding to a particular request by inserting information from a previous response to the previous request into the dependent emulated request.

5. The system of claim 1, wherein the operations further comprise:
    identifying, in the sequence, a previous response to the previous request, wherein the previous response produced at least one dynamic data item;
    executing the previous request;
    extracting at least one dynamic data item from the previous response; and
    inserting the at least one dynamic data item into the emulated request.

6. The system of claim 5, wherein the operations further comprise replacing specified information in the emulated request with the dynamic data item, wherein the specified information was copied from a corresponding pre-recorded request.

7. The system of claim 1, wherein the system further comprises a token-instances repository, and wherein the operations further comprise:
    monitoring one or more monitored responses received from an application server in response to the emulated requests;
    detecting a one-time token value in a given monitored response;
    storing the one-time token value in the token-instances repository; and
    replacing a recorded token value in the emulated request with the one-time token value.

8. The system of claim 1, wherein the code further comprises client-side instructions to generate a one-time token value, and wherein the client-side instructions comprise instructions to insert the generated token value into the emulated request instead of a recorded token value.

9. The system of claim 1, wherein the operations further comprise:
    producing a testing agent; and
    planting the testing agent in an application server.

10. The system of claim 9, wherein the testing agent is configured to:
    monitor an activity item in the tested application;
    associate the activity item with an accessed application page;
    store the activity item in correlation with the accessed application page and corresponding requests; and
    identify, based on the correlation, a dependent application page.

11. The system of claim 1, wherein the operations further comprise:
    generating an emulated sequence comprising a plurality of sequential requests;

determining a target outcome;
identifying a dependent request in the emulated sequence; and
producing a reduced emulated sequence by:
  executing the emulated sequence without an independent request of the emulated sequence to produce a reduced response;
  determining the validity of the reduced response, by comparing the reduced response to the target outcome; and
  removing the independent request from the emulated sequence when the reduced response is valid.

12. A method comprising:
generating, by a processor, an emulated request based on a first stored request of a sequence stored in a memory;
transmitting, by the processor, the emulated request to an application server;
receiving, by the processor, a received response to the emulated request from the application server;
detecting, by the processor, a dependency between the first stored request and a second stored request of the sequence of requests stored in the memory, based on whether the received response to the emulated request is valid;
calculating, by the processor, an adapted emulated request sequence based on the dependency, wherein the adapted emulated request sequence is a result of an adaptation process executed by the processor using a machine learning (ML) based adaptation mechanism;
transmitting, by the processor, the adapted emulated request sequence to the application server; and
adapting, by the processor, a dependent emulated request that depends on a previous request of the sequence of requests by inserting, by the processor, into the dependent emulated request, information from a response to the previous request on which the dependent emulated request depends.

13. The method of claim 12, further comprising:
comparing, by the processor, the received response to a corresponding pre-recorded response;
determining, by the processor, a similarity measure between the received response and the corresponding pre-recorded response; and
deciding, by the processor, based on the similarity measure whether the received response is valid.

14. The method of claim 12, further comprising:
adapting, by the processor, the dependent emulated request corresponding to a particular request by inserting information from a previous response to the previous request into the dependent emulated request.

15. The method of claim 12, further comprising:
identifying, by the processor, in the sequence, a previous response to the previous request, wherein the previous response produced a dynamic data item;
executing, by the processor, the previous request;
extracting, by the processor, the dynamic data item from the previous response; and
inserting, by the processor, the dynamic data item into the emulated request.

16. The method of claim 15, further comprising:
replacing specified information in the emulated request with the dynamic data item, wherein the specified information was copied from a corresponding pre-recorded request.

17. The method of claim 12, further comprising:
monitoring, by the processor, one or more monitored responses received from the application server in response to the emulated request;
detecting, by the processor, a one-time token value in a given monitored response;
storing, by the processor, the one-time token value in a token-instances repository; and
replacing, by the processor, a recorded token value in the emulated request with the one-time token value.

18. The method of claim 12, further comprising:
instructing, by the processor, a client-side device to generate a one-time token value and insert the generated token value into the emulated request instead of a recorded token value.

19. The method of claim 12, further comprising:
producing, by the processor, a testing agent; and
planting, by the processor, the testing agent in the application server, wherein the testing agent is configured to:
  monitor an activity item in the tested application;
  associate the activity item with an accessed application page;
  store the activity item in correlation with the accessed application page and corresponding requests; and
  identify, based on the correlation, a dependent application page.

20. The method of claim 12, further comprising:
generating, by the processor, an emulated sequence comprising a plurality of sequential requests;
determining, by the processor, a target outcome;
identifying, by the processor, a dependent request in the emulated sequence; and
producing, by the processor, a reduced emulated sequence by:
  executing, by the processor, the emulated sequence without an independent request of the emulated sequence to produce a reduced response;
  determining, by the processor, a validity of the reduced response by comparing the reduced response to the target outcome; and
  removing, by the processor, the independent request from the emulated sequence when the reduced response is valid.

21. A testing server comprising:
a memory configured to store a sequence of requests;
a processor configured to implement a testing engine, wherein the testing engine is configured to:
  generate an emulated request based on a first stored request from the sequence of requests stored in the memory;
  transmit the emulated request to an application server coupled to the testing server;
  receive, from the application server, a response to the emulated request;
  detect a dependency between the first stored request and a second stored request of the sequence of requests stored in the memory, based on whether the received response to the emulated request is valid;
  calculate an adapted emulated request sequence based on the dependency, wherein the adapted emulated request sequence is a result of an adaptation process executed by the processor using a machine learning (ML) based adaptation mechanism; and
  transmit the adapted emulated request sequence to the application server;
wherein the testing engine is further configured to adapt a dependent emulated request that depends on a previous request of the sequence of requests by inserting, into the dependent emulated request, information from a response to the previous request on which the dependent emulated request depends.

* * * * *